United States Patent Office 3,117,381
Patented Jan. 14, 1964

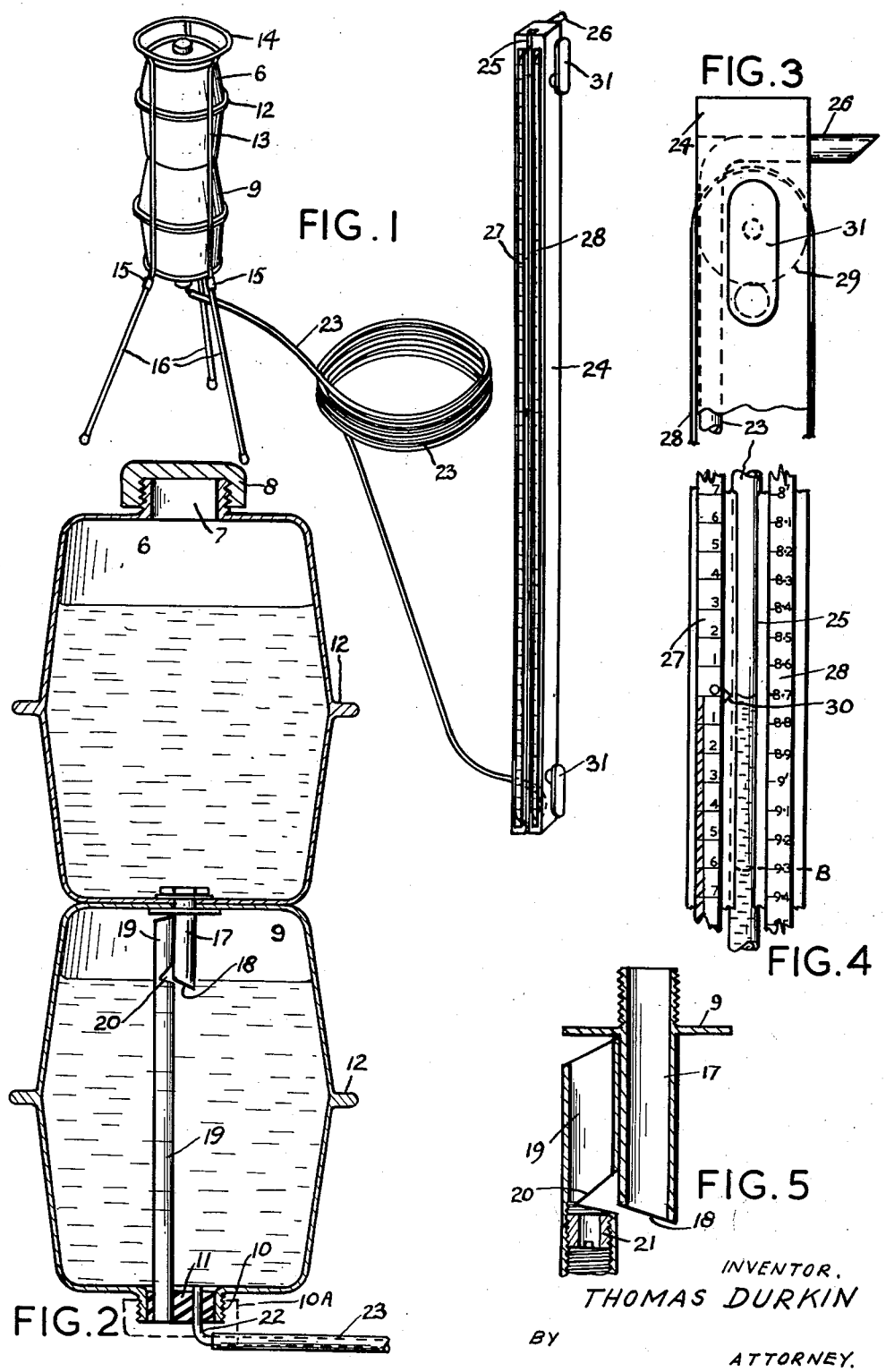

3,117,381
LEVELLING INSTRUMENTS FOR MEASURING
LAND LEVELS AND THE LIKE
Thomas Durkin, 124 Old Pittwater Road, Brookvale,
near Sydney, New South Wales, Australia
Filed Oct. 18, 1961, Ser. No. 145,904
Claims priority, application Australia Nov. 24, 1960
9 Claims. (Cl. 33—209)

This invention relates to apparatus for measuring the levels of land, structures and the like, for the use of architects, builders, engineers, surveyors, construction workers, farmers and other persons who may require an accurate levelling instrument at reasonable cost.

The invention has been devised to provide a levelling instrument which is of simple and efficient form assuring high accuracy, and can be used without the making of calculations to determine rise or fall and/or reduced levels as is necessary in the case of known forms of apparatus, and has wide application in various fields, and can be operated by one man without special skill. Levels can be taken around corners, and through dense scrub from the one set-up, and levels determined faster than by the known forms of apparatus, and present apparatus is not affected by vibrations as may be encountered in construction work. Other advantages will be apparent from the following description.

According to this invention, the levelling instrument for measuring land levels and the like, comprises an automatic constant level tank device containing a quantity of liquid and having provision for filling, an overflow, and a supply connection at the lower or bottom portion; a tube of transparent flexible form such as of plastic material and of a suitable length, connected at one end to the supply connection of said tank device, and at the other end connected to an indicating staff along which portion of said tube is arranged adjacent one or more scales of adjustable sliding form, and with which scale or scales the level of the liquid in the connected portion of said tube indicates the height, rise or fall of one or more selected points relative to a given point.

The sliding scales fitted to the indicating staff may be calibrated in any suitable manner, as for example, in feet and inches and mounted to slide lengthwise of said staff and kept located in such movement, and may have provision for retaining a setting. Said scales may be of flexible tape formed in endless manner and if desired coloured in distinctive manner. Spring or elastic means may be interposed therein preferably in the portion to the back to tension same.

The staff may be formed of wood or any other suitable material and recessed to enable the tubing to be fitted in one face thereof adjacent the scale or scales, and clipped or otherwise suitably secured in place preferably in a manner permitting of ready detachment. There may be provision at one side of the said staff for coiling the tubing thereabout for storage out of the way. A cover may be fitted over the scale or scales at the back.

In order to describe the invention more fully, reference will now be made to the drawings accompanying and forming part of this complete specification, and wherein:

FIGURE 1 is a perspective of the levelling instrument, while

FIGURE 2 is a sectional elevation of the constant level tank device.

FIGURE 3 is a side elevation of the upper part of the indicating staff, and

FIGURE 4 a fragmentary face elevation, showing the calibrated scales.

FIGURE 5 is an enlarged sectional elevation of the overflow and supply means of the constant level tank device.

The constant level tank device consists of an upper reservoir vessel 6 having a filling neck 7 on which a closure cap 8 is screwed, and a lower supply vessel 9 secured thereto and having a bottom neck 10 in which a plug 11 of rubber or the like is fitted. The tank device 6—9 may be formed of translucent plastic so that the liquid contents, particularly of the top reservoir vessel 6, may be readily seen, and each vessel has a circular strengthening medially located flange 12, and the said device is fitted in a frame 13 having a circular handle 14 at the top by which it may be manipulated about, and there are lower sockets 15 in which three extension legs 16 are fitted as seen in FIGURE 1, and may be secured in place by thumb screws or other suitable means. In some constructions (not shown) telescopic legs may be fitted.

In the abutted walls of the vessels 6 and 9 an inlet pipe 17 is centrally arranged leading from one vessel to the other and secured in place by nut and washer means in known manner to effect a joint and also secure the said vessels together. The end of said inlet pipe 17 extends a short distance down into the supply vessel 9 and has the end cut on the bias as shown at 18 in FIGURES 2 and 5.

An overflow pipe 19 is arranged close alongside the inlet pipe 17 and has its top end cut on the bias as seen in FIGURES 2 and 5 and leads from a location close to the top of the supply vessel 9 and has a saw tooth shaped outlet slot 20 formed in it alongside the end 18 of inlet pipe 17. The lower end of said pipe 19 extends through the plug 11 to discharge any overflow from the supply vessel 9.

The overflow pipe 19 has in its bore adjacent the outlet slot 20 a nipple 21 located in a threaded portion so that it can be adjusted to set the overflow level to suit the various liquids having different surface tension characteristics. This nipple 21 will be later further explained when describing the instrument in use.

An outlet elbow 22 of small size is fitted in the plug 11 in liquid tight manner and has one end of the tubing 23 coupled thereto.

This tubing 23 is of clear plastic of flexible form and constitutes the level indicator when the liquid is entrained therein and is of any length to suit the requirement.

The staff 24 is of any suitable material and of desired length and has a centrally positioned groove 25 provided therein extending from end to end with a hole leading through to the back at or near the ends, and the free end of the tubing 23 is led through the lower hole from the back of the staff and brought up along the groove 25 and its extremity led out through the hole at the top end, such end being indicated by the reference 26 as shown in FIGURE 3. When not in use this end 26 may be closed by a removable plug.

The scales 27 and 28 of endless band form suitably calibrated are mounted in recesses in the staff 24 on either side of the positioned portion of the tubing 23 and led over pulleys at either end so as to be readily slidable, one such pulley is shown at 29 in FIGURE 3. The scale 27 may constitute the rise and fall scale while the other 28 constitutes the reduced level scale.

A pointer 30 may be provided on the rise and fall scale 27 at the zero point as shown in FIGURE 4 or other suitable form of index means included.

In order to provide for the storage of the tubing a pair of spaced clips 31 are arranged on one side of the staff at the top end of which one clip 31 is shown and about which such tubing may be wound. It is not necessary to unwind all the tubing from the staff 24 when working over a limited area or in transporting the instrument from one position to another. The one clip, say the top one, may be pivoted in place so that by turning it the wound tubing can be quickly released.

A suitable liquid for use in the constant level tank device is water although not confined thereto.

In operation, the upper vessel 6 and lower supply vessel 9 are first filled with water by removing the cap 8 and allowing sufficient time for the said lower supply vessel 9 to fill. A cap in dotted lines at 10A similar to cap 8 is previously fitted to the neck 10, the elbow 22 having been previously removed and suitably stored, say in a hole on the indicating staff 24. After filling the cap 8 is replaced in an airtight manner.

The tank device 6—9 is then turned upside down and placed on the ground with the three legs 16 pointing upwards and the cap 10A on the neck 10 is removed and the elbow 22 fitted in place as seen in FIGURE 2.

The staff 24 is then placed flat on the ground or other convenient surface, and some of the plastic tubing 23 unwound from the clips 31 and the free end connected to the elbow 22, the rest of the tubing 23 may be left on the staff 24 and the end portion is entrained in the staff as will be seen in FIGURE 1 between the two scale bands 27 and 28. Excess water escapes from the overflow pipe 19 and said tubing 23 will be filled with water through the supply elbow 22 carrying with it the air in such tubing and it will be necessary to wait until the air bubbles (which can be readily detected due to the movement of water) are expelled and then the staff 24 is uprighted and the apparatus is ready for operation. This setting-up procedure takes very little time and is only carried out when the apparatus is intially set-up.

Changes of location of the apparatus on the site can be effected by carrying the tank device to another position with the tubing 23 still attached.

The nipple 21 is used to set the overflow level and may be adjusted in the place of manufacture or by the user on the job. This adjustment may be effected by inserting a screw driver or other suitable tool up the overflow pipe 20 and turning the nipple by a saw cut or the like formed in the underside as seen in FIGURE 5, to increase or decrease its height and hence the overflow level relative to the orifice of the inlet pipe 17. If the nipple 21 is turned anticlockwise to reduce the level of the overflow the liquid starts to escape out of the overflow pipe 19 accompanied by air bubbles rising in the liquid of the top supply vessel 6 as liquid from such vessel is released to replace the liquid which has escaped from the lower vessel 9. The nipple 21 is then slowly turned clockwise until the air bubbles stop rising in the supply tank 6 although with the cessation of liquid escaping from the overflow pipe 19.

The arrangement above described ensures that the level of the liquid in the portion of tubing 23 set in the staff 24 will be constant under a number of conditions, as for example:

(1) Heat from the sun expanding air in the top reservoir vessel 6 and allowing liquid to transfer to the lower vessel 9.
(2) Expansion or contraction of the walls of the vessels or the tubing.

Now to determine the rise or fall in height or say two selected positions from a first or base position, and/or the reduced level of the two selected positions when the reduced level of the said first or base position is known, the tank device 6—9 is set up in a convenient position to enable the most effective use of the tubing 23. The staff 24 is then taken to the first or base position. The left hand sliding scale 27 shown in FIGURE 4 is moved until the zero pointer 30 is opposite the level of the water in the tubing 23. This scale 27 is the rise and fall scale and the lower section is clearly marked in a distinctive colour such as red. The right hand scale 28 (reduced level) is moved until the given reduced level of the first or base position is opposite the level of water in the tubing 23. Assume the reduced level of said first position is 8.7 then the scale 28 is moved until 8.7 is opposite the level of water in the tubing 23 as shown in FIGURE 4. When the staff 24 is taken to another position, say the first of the two selected positions which is for example 0.6 unit higher than the first position, the water level in the staff 24 will fall by 0.6 unit. This occurs because the constant level vessel 9 maintains a constant level of water in the tubing 23 and since the staff 24 has moved up 0.6 units the rise of 0.6 unit can be read off the red rise scale. In addition the reduced level of the first of the selected positions which by the same reasoning must be 8.7 plus 0.6, is read off the reduced level scale 28 directly as 9.3 (see FIGURE 4 position shown in dotted lines at "B").

Having set both scale bands 27 and 28 at the first position, either rises or falls and/or reduced levels whether higher or lower, of any position can be read off said scales directly.

I claim:

1. A levelling instrument for measuring land levels and the like, comprising an automatic constant level tank device containing a quantity of liquid and having provision for filling, an overflow, and a supply connection at the lower or bottom portion; a tube of transparent flexible form such as of plastic material and of a suitable length, connected at one end to the supply connection of said tank device, and at the other end connected to an indicating staff along which portion of said tube is arranged adjacent one or more scales of adjustable sliding form, and with which scale or scales the level of the liquid in the connected portion of said tube indicates the height, rise or fall of one or more selected points relative to a given point.

2. A levelling instrument for measuring land levels and the like, according to claim 1, wherein the constant level tank device consists of an upper reservoir vessel having a filling neck on the top to receive a closure cap, and a lower supply vessel secured thereto and having a bottom neck in which a plug, preferably of rubber or the like, is fitted, and said neck also adapted to receive a closure cap thereon, an inlet pipe arranged in the bottom of said reservoir vessel leading into the top portion of the lower supply vessel, and the overflow consisting of a pipe open at both ends leading from the top of said supply vessel through the said plug to a discharge location and having therein, at or near the end of the said inlet pipe an outlet slot, and the liquid supply connection formed as an elbow fitted in the said plug.

3. A levelling instrument for measuring land levels and the like according to claim 2, wherein the inlet pipe has its lower end cut on the bias and the outlet pipe positioned alongside the said inlet pipe has its outlet slot arranged facing the lower end of said inlet pipe and formed in saw tooth shaping.

4. A levelling instrument according to claim 2 wherein the overflow pipe has in its bore adjacent the outlet slot a nipple located in a threaded portion of the pipe bore so that it can be adjusted to suit various liquids having different surface tension characteristics.

5. A levelling instrument for measuring land levels and the like according to claim 1, wherein one free end portion of the tubing is located in a groove extending lengthwise of the indicating staff and a slidable scale is fitted on one or both sides of the said groove.

6. A levelling instrument for measuring land levels and the like according to claim 1 wherein each scale is of endless band form suitably calibrated and fitted in a recess in the indicating staff extending along the front face thereof and fitted over pulleys set in the said staff and continuing along the back face thereof.

7. A levelling instrument for measuring land levels and the like according to claim 1, wherein two sliding scales are fitted to the staff one on either side of the tubing positioned in the face of said staff, one such scale constituting a rise and fall scale, while the other scale constitutes a reduced level scale.

8. A levelling instrument for measuring land levels and the like according to claim 7, wherein a pointer is provided on the rise and fall scale at the zero point.

9. A levelling instrument for measuring land levels and the like according to claim 1, wherein means such as clips or the like are provided on one side of the indicating staff to store the tubing wound thereabout.

No references cited.